(12) United States Patent
Chen et al.

(10) Patent No.: US 9,544,316 B2
(45) Date of Patent: Jan. 10, 2017

(54) METHOD, DEVICE AND SYSTEM FOR DETECTING SECURITY OF DOWNLOAD LINK

(71) Applicant: BEIJING QIHOO TECHNOLOGY COMPANY LIMITED, Beijing (CN)

(72) Inventors: Ningyi Chen, Beijing (CN); Yipeng Zhu, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 245 days.

(21) Appl. No.: 14/347,399

(22) PCT Filed: Sep. 21, 2012

(86) PCT No.: PCT/CN2012/081748
§ 371 (c)(1),
(2) Date: Mar. 26, 2014

(87) PCT Pub. No.: WO2013/044757
PCT Pub. Date: Apr. 4, 2013

(65) Prior Publication Data
US 2014/0237593 A1     Aug. 21, 2014

(30) Foreign Application Priority Data
Sep. 28, 2011   (CN) .......................... 2011 1 0300452

(51) Int. Cl.
*H04L 29/06* (2006.01)
*G06F 21/51* (2013.01)
(52) U.S. Cl.
CPC ........... *H04L 63/1408* (2013.01); *G06F 21/51* (2013.01); *G06F 2221/2119* (2013.01); *H04L 63/145* (2013.01)
(58) Field of Classification Search
CPC ..... H04L 63/1408; H04L 29/06877–29/06938; H04L 63/145; G06F 21/51; G06F 2221/2119
See application file for complete search history.

(56) References Cited

U.S. PATENT DOCUMENTS 7,958,555 B1    6/2011  Chen et al.
2007/0261112 A1*  11/2007  Todd ..................... G06F 21/577
                                                726/11
(Continued)

OTHER PUBLICATIONS

International Search Report regarding PCT/CN2012/081748, issued Dec. 13, 2012, 4 pages.
(Continued)

*Primary Examiner* — Matthew Smithers
(74) *Attorney, Agent, or Firm* — James M. Stipek; Polsinelli PC

(57) ABSTRACT

A method, a device and a system for detecting security of a download link are provided. The method comprises: pre-acquiring an information set of download link security (S101); performing a feature matching between information of a download link and content of the information set of download link security (S102); and identifying security of the download link according to a result of the feature matching, and presenting an identification result to a user (S103). In the method, device and system, statistics regarding security of download links in a network are collected in advance to generate an information set, whether a download link in a webpage is secure is determined according to the preset information set, and a corresponding prompt is provided to a user, so that the user can know the security of the download link before downloading, thereby reducing ineffective download behaviors and the consumption of network bandwidth resources.

16 Claims, 2 Drawing Sheets

(56) References Cited

U.S. PATENT DOCUMENTS

| | | | |
|---|---|---|---|
| 2008/0172738 A1* | 7/2008 | Bates | G06F 17/30887 |
| | | | 726/22 |
| 2010/0017880 A1* | 1/2010 | Masood | G06F 21/51 |
| | | | 726/24 |
| 2012/0011588 A1* | 1/2012 | Milener | G06F 21/51 |
| | | | 726/24 |
| 2012/0090025 A1* | 4/2012 | Milner | G06F 21/564 |
| | | | 726/22 |

OTHER PUBLICATIONS

CN101137156A, English translation of Abstract only, one page.
CN101924760A, English translation of Abstract only, one page.
Abstract of http://news.dahe.cn/2010/09-13/100464884.html, dated Sep. 13, 2010, one page.

* cited by examiner

METHOD, DEVICE AND SYSTEM FOR DETECTING SECURITY OF DOWNLOAD LINK

FIELD OF THE INVENTION

The present invention relates to the technical field of Internet application, and particularly to a method, a device and a system for detecting security of a download link.

BACKGROUND OF THE INVENTION

Along with development of the Internet, more and more users are used to searching and downloading resources of their interest from the Internet. However, while providing convenience for the users, the Internet also provides a propagation environment for malicious programs such as computer virus and Trojan virus. Producers or propagators of malicious programs often disguise the malicious programs as other resources, or hide and entrain the malicious programs in other resource packets. If other users download such resources into the computer, the computer is very easily infected by virus or Trojan so as to result in various undesirable consequences.

In order to improve the security of a computer system, a majority of users choose to install anti-virus software in the computer. The anti-virus software generally has a real-time monitoring function, the basic principle of which is to perform feature matching between the data to be written into the local computer and the features in a virus database or Trojan database of the anti-virus software, and to refrain the data from being further saved to the local computer if the data is judged to be virus or Trojan.

The real-time monitoring function of current anti-virus software may effectively prevent malicious programs in the network from entering and staying in the local computer and from further propagation. However, this manner still has some drawbacks. Since comparison between data and features will be performed, it is usually necessary to completely download the data into the local computer before performing a detection. The anti-virus software may remove the virus before the malicious programs run, but the downloading has already been done at this time, so the user's efforts and time are still wasted and the network bandwidth resource is occupied uselessly. As the size of the resource to be downloaded increases, this problem will become more obvious.

SUMMARY OF THE INVENTION

In view of the above problems, the present invention is proposed to provide a method, a device and a system for detecting security of a download link, which can overcome the above problems or at least partially solve or ease the above problems.

According to an aspect of the present invention, there is provided a method for detecting security of a download link, comprising: pre-acquiring an information set of download link security; performing a feature matching between information of a download link and content of the information set; and identifying security of the download link according to a result of the feature matching, and presenting an identification result to a user.

According to another aspect of the present invention, there is provided a device for detecting security of a download link, comprising: an information set acquiring unit configured to pre-acquire an information set of download link security; a feature matching unit configured to perform a feature matching between information of a download link and content of the information set; and an identifying unit configured to identify security of the download link according to a result of the feature matching and present an identification result to a user.

According to a further aspect of the present invention, there is provided a system for detecting security of a download link, comprising: a network side server, a first class of clients and a second class of clients; wherein the first class of clients are configured to, upon completion of resource download, detect security of the downloaded resource and report a detection result to the network side server; the network side server is configured to generate the information set of download link security according to the detection results reported by one or more of the first class of the clients; the second class of clients includes the aforesaid device for detecting security of a download link.

According to another aspect of the present invention, there is provided a computer program which comprises a computer readable code; wherein when the computer readable code is run on a server, the server executes the method for detecting security of a download link.

According to a further aspect of the present invention, there is provided a computer readable medium which stores the computer program.

Advantageous effects of the present invention are as follows: statistics regarding security of download links in a network are collected in advance to generate an information set, whether a download link in the webpage is secure is judged according to the preset information set, and a corresponding prompt is provided to a user, so that the user can know the security of the download link before downloading, thereby reducing ineffective download behaviors and the consumption of network bandwidth resources.

The above description is only generalization of technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF DRAWINGS

Various other advantages and merits will become apparent to those having ordinary skill in the art by reading through the following detailed description of preferred embodiments. Figures are only intended to illustrate preferred embodiments not to limit the present invention. In all figures, the same reference number denotes the same part. In the figures.

DETAILED DESCRIPTION OF EMBODIMENTS

The present invention will be further described below with reference to figures and specific embodiments. In order to enable those skilled in the art to understand technical solutions of the present invention better, the technical solutions in the present invention will be described in detail with reference to the figures. Obviously, the described embodiments are only partial embodiments of the present invention, not all embodiments. All other embodiments obtained by those having ordinary skill in the art based on embodiments in the present invention shall fall within the protection scope of the present invention.

First, description is given to a method for detecting security of a download link according to the present invention. The method may comprise the following steps:

pre-acquiring an information set of download link security;

performing a feature matching between information of a download link and content of the information set; and identifying security of the download link according to a result of the feature matching, and presenting an identification result to a user.

An executive body of the above method may be a detecting device of download link security located at a client. The device may be, as a function module, built in software such as anti-virus software, Internet-surfing protection software or a browser. Certainly, the device may also not be built in other software as a function module, and instead exists independently and is used. The information set of download link security is generated by collecting statistics regarding security of download links in the network, and the information set may either be preset in the device, or be acquired from a network server after the client is connected to the network. The information set may be carried in a plurality of specific modes, for example, in the form of a list or a text, which is not limited in the present invention. To facilitate subsequent description, a "list" only as an example is taken in place of the "information set". When the user gets online, the device judges whether the download link in the network is secure according to the preset list and presents a corresponding prompt to the user, so that the user can know the security of the download link before downloading, thereby avoiding wasting excessive time and efforts on unsecure download links and meanwhile reducing the consumption of network bandwidth resources.

Figure 1:
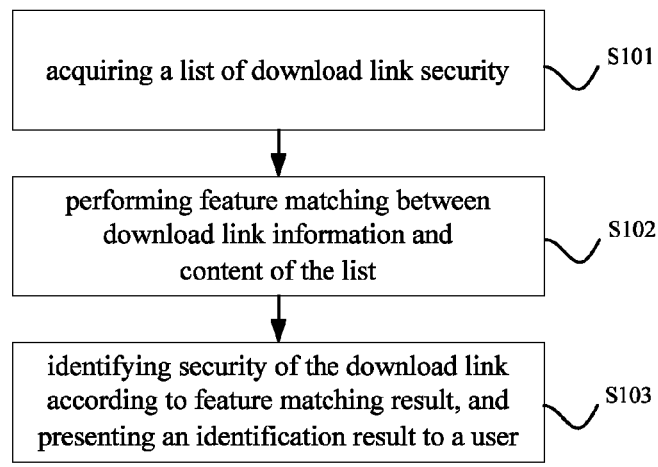
FIG. 1 illustrates a flow chart of a method for detecting security of the download link according to an embodiment of the present invention.
Figure 2:
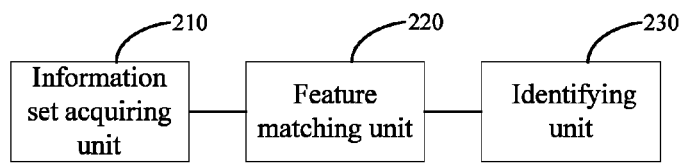
FIG. 2 illustrates a structural schematic view of a device for detecting security of a download link according to an embodiment of the present invention.

FIG. 1 illustrates a flow chart of a method for detecting security of a download link according to the present invention, comprising the following steps:

S101: acquiring a list of download link security.

According to the solution provided by the present invention, firstly it is necessary to have a list capable of identifying download link security in order to detect the security of the download link. In this list are recorded URLs of several download links and also recorded whether the corresponding resource of each of the URLs is secure. In practical application, the list may be in a form of black list or white list or a mixed form of black list and white list, wherein the black list indicates a set of unsecure download links while the white list indicates a set of secure downlink links.

The content of the list of download link security may be obtained according to a certain amount of testing statistics, and may be updated and improved constantly. Each URL in the list may be a specific download resource address, which is adapted for such a situation that the security of a certain specific link is already confirmed; and it may also be the domain name of a certain website or a website path, which is adapted for such a situation that overall security of the website is already confirmed. For example, the security of software as download resources provided by some official websites is guaranteed, and such websites may be recorded in the form of a website white list; download resources provided by some websites often carry virus or Trojan, and such websites may be recorded in the form of a website black list.

S102: performing a feature matching between information of a download link and the content of the list.

S103: identifying security of the download link according to a result of the feature matching, and presenting an identification result to a user.

The most common download behavior of a user during surfing the Internet is to find a download link in a browsed web page, and then perform a downloading by directly clicking the download link in the web page or by using a download software. For such a download behavior, the solution provided in an embodiment of the present invention is to trigger the step S102 while the user is browsing the web page. The solution is specifically as follows.

When the user is browsing the web page, the information of the download link in the current web page is extracted. This step may be implemented by acquiring a source code of the web page and extracting from the source code a portion having features as download links. Furthermore, feature matching is performed between the extracted download link information and the content of the list of download link security. If the extracted download link information is successfully matched with the white-list portion in the list, it is believed that the extracted download link is secure. If the extracted download link information is successfully matched with the black-list portion in the list, it is believed that the extracted download link is unsecure.

In step S103, the security of the download link in the web page is further identified according to the matching result from the step S102. In practice, it is feasible to change the presentation of the download link in the current web page by rewriting the code of the web page. For example, an unsecure link may be identified by placing a box around the link content, or by an eye-catching color or font, or by a picture or word adjacent to the link. Secure links may also be processed in a similar way. As such, upon browsing a web page, the user is clear about which links in the web page are secure links and which links are unsecure links at a glance, thereby preventing unsecure content from being downloaded. Besides, if the web address of the web page being browsed by the user currently matches with a certain black-listed or white-listed web address in the list of download link security, this indicates that all links in the web page are secure or unsecure. In this case, in addition to giving security identifiers to all download links in the web page, it is feasible to identify the whole web page as a unit to inform the user of the overall security of the web page. Those skilled in the art may understand that the web page stated in this paragraph may be called website, the web address of the web page may also be called a web address of the website, so that identify the whole web page as a unit may also expressed as identifying the whole website as a unit.

It may be appreciated that in practice if the list of download link security only includes a black list, only unsecure links in the web page may be identified in the step S103; if the list of downlink link security only includes a white list, only secure links in the web page may be identified in the step S103; and if the list of download link security includes a black list as well as a white list, secure links and unsecure links in the web page may be identified simultaneously in the step S103, or only one kind of links may be identified. When the download link cannot be successfully matched with the white list or black list, it is believed that the security of the download link temporarily cannot be judged, an identifier may not be given or various identifiers indicative of "unable to judge security" or similar meaning may be provided. In one word, the user preferably selects those download links identified as "secure", and should not select those download links identified as "unsecure".

In another embodiment of the present invention, the step S102 may be triggered when the user executes a download operation, as described in detail as follows.

When the user triggers the download operation, feature matching will be performed between the download link information and the content of the list. The user's download operation may comprise: directly clicking the download link in the web page, using a downloading tool to download the download link, inputting a download address into a browser address bar or a downloading tool, or the like. According to the solutions of embodiments of the present invention, after the user's download behavior is detected, the feature matching begins to be performed between the download link information and the content of the list of download link security; and before the user confirms the download operation, the security of the link to be downloaded by the user is identified and the identification result is presented to the user.

It may be understood that in the present embodiment, it is possible to identify only unsecure links and present them to the user so as to let the user stop the download operation. If the download link is detected to be secure, it may be reported to the user to enable the user to download at ease, or it may not be reported to the user to avoid influence on the user's normal download.

Compared with the previous embodiment, the advantage of the solution in the present embodiment lies in that it is not necessary to rewrite the page code, and that the security detection for the download link is performed only when the user executes the download operation, so as to achieve a more targeted detection. Additionally, in the case that the user does not download when browsing the web page (for example, he know a download link from a channel such as a chat software), security of the download link cannot be acquired by browsing the web page, and this problem can be effectively solved by employing the solution of the present embodiment.

Those skilled in the art may appreciate that there are many other trigger manners to trigger the step S102 besides the modes when the user browses the web page or the user executes the download operation as exemplified above, and embodiments of the present invention do not be limited in this regard. For example, it is not excluded that step S102 is triggered in advance before the user browses the web page, i.e., feature matching is performed between the information of some crucial download links and the content of the security information set in advance, security of these download links is judged, and then the identification result will be presented to the user when the user browses the web page or executes the download operation.

The technical solution provided by the present invention is implemented in the client used by the user. After the client software is installed initially, a basic list of download link security may exist locally in the client. As security of download links in the list might change at any time and the amount of resource in the network is huge, the content of the list may be enriched and improved constantly by testing. In an embodiment of the solution of the present invention, a server may be provided at a network side to store the latest list of download link security, the client may download the list of download link security as it initial list or constantly update the list of download link security by connecting to the server. An updating mode may be manual triggering by users, periodical triggering, or voluntary pushing by the server, similar to an update mechanism of an anti-virus database of the anti-virus software.

In an embodiment according to the present invention, the network side server may also generate the list of download link security according to detection results reported by other clients. The specific method is as follows.

Since many users choose to install anti-virus software in their computers, the real-time monitoring function of these anti-virus softwares can detect data that have just been downloaded to the local computer and determines whether the downloaded data can be written into the local computer safely according to the detection results. In the embodiment of the present invention, the client installed with the anti-virus software, after finishing detection for the downloaded data, reports the detection results (i.e. secure or not) along with the address of the download link to the network server. In this way, the server can quickly collect a lot of detection results and more efficiently enrich and improve the content of the list of download link security.

According to actual needs, the client installed with the anti-virus software may only report the detected unsecure download links to the network side server, or may report all detection results to the network side server, which is not limited by the present invention.

The solution of the present embodiment makes full use of the characteristic that there are a large number of Internet users, diverts the testing task, which should originally be completed by a system side, to individual users on the Internet. As such, without increasing human costs on the system side, the content of the list of download link security is updated constantly, and the detecting capability of the device for detecting download link security is constantly boosted accordingly.

Corresponding to the above method embodiment, the present invention further provides a device for detecting security of a download link, comprising:

an information set acquiring unit 210 configured to pre-acquire an information set of download link security; wherein the information set of download link security acquired by the information set acquiring unit 210 may comprise one or more of the following content: download link black list, download link white list, download website black list, and download website white list;

a feature matching unit 220 configured to perform a feature matching between information of a download link and content of the information set; and an identifying unit 230 configured to identify security of the download link according to a result of the feature matching and present an identification result to a user.

The identifying unit 230 may be used to identify secure download links in the web page, or identify unsecure download links in the web page, and present the identification result to the user.

In an embodiment of the present invention, the feature matching unit 220 may be specifically configured to:

extract the information of the download link in the current web page when the user is browsing the web page, and perform the feature matching between the extracted download link information and the content of the information set.

Correspondingly, the identifying unit 230 may be specifically configured to:

identify the security of the download link by rewriting the current web page's code so as to change a presentation of the download link in the current web page, and present the identification result to the user.

In another embodiment of the present invention, the feature matching unit 220 may further be configured to:

perform the feature matching between the information of the download link and the content of the information set when the user triggers a download operation.

Correspondingly, the identifying unit 230 may be specifically configured to: identify the security of the link to be downloaded by the user before the user confirms the download operation.

Figure 3:
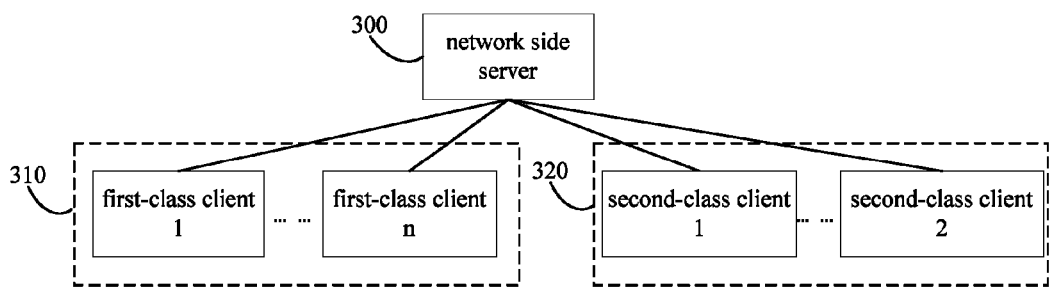
FIG. 3 illustrates a structural schematic view of a system for detecting security of a download link according to an embodiment of the present invention.

According to an embodiment of the present invention, the information set acquiring unit 210 may directly acquire the information set of download link security preset in the local computer, or acquire the information set of download link security from the network side server, and get updated synchronously with the network side at any time. In respect of the second mode for acquiring the information set of download link security, the present invention further provides a system for detecting security of a download link. As shown in FIG. 3, the system comprises a network side server 300, a first class of clients 310 and a second class of clients 320.

The first class of clients 310 are configured to, upon completion of resource download, detect security of the downloaded resource and report a detection result to the network side server;

The network side server 300 is configured to generate the information set of download link security according to the detection results reported by one or more of the first class of the clients;

The second class of clients 320 includes the aforesaid device for detecting security of the download link.

In practical application, the first class of clients 310 correspond to computers installed with conventional anti-virus software, and they are characterized by performing the security detection after downloading data to the local computer. The second class of clients 320 correspond to the subjects for executing the method for detecting security of the download link according to the present invention, and they aim to detect the security of the download link before the downloading. Those skilled in the art may appreciate that in the embodiments of the present invention, the first class of clients 310 and the second class of clients 320 are divided only based on a logical level. In an actual physical environment, a certain physical client might belong to the first class of clients which uploads its detection result of security of the local downloaded data, and it might also belong to the second class of clients which acquires the information set of download link security including the detection results of others of the first class of clients from the server side.

As the first class of clients objectively abound in the Internet, the solution of the present embodiment makes full use of this point, and diverts the testing task originally to be completed by the system side to individual users on the Internet. As such, without increasing human cost on the system side, the content of the information set of download link security can be updated constantly, and a security detecting capability of the second class of clients 320 can be boosted constantly.

To facilitate description, the above devices are respectively described with various units according to functions. When the present invention is implemented, the functions of the various units may be implemented in a same or a plurality of software and/or hardware.

As known from description of the above embodiments, those skilled in the art can clearly understand that the present invention may be implemented by means of software with necessary universal hardware platforms. Based on such an understanding, the nature of technical solution of the present invention, namely, portions thereof making contribution over the prior art, may be embodied in the form of software product. The computer software product may be stored in storage media, e.g., ROM/RAM, magnetic disk, or optical disc, and includes several instructions to enable a computer equipment (which may be a personal computer, server, network device or the like) to execute the method as described in the embodiments of the present invention or some portions of the embodiments.

Embodiments of the present description all are described in a progressive manner. As to identical or similar portions of individual embodiments, cross-reference may be made to each other. Each embodiment is focused on differences from other embodiments. Particularly, regarding device or system embodiments, since they are substantially similar to method embodiments, they are described relatively simply, and reference may be made to partial description of the method embodiments at related points. The devices and systems described above are only illustrative, wherein units described as separate members may be or may not be physically separate, members shown as units may be or may not be physical units, i.e., they may be located at one place or may be distributed in a plurality of network units. Partial or all modules therein may be selected according to actual needs to achieve the object of the solution of the present embodiment. Those having ordinary skill in the art may understand and implement these without contributing any inventive work.

Embodiments according to the present invention may be implemented in hardware, or implemented by software modules running on one or more processors, or implemented in their combinations. Those skilled in the art should understand that a microprocessor or digital signal processor (DSP) may be used in practice to implement some or all functions of some or all parts of the device for detecting security of download link according to embodiments of the present invention. The present invention may also be implemented as an apparatus or device program (e.g., computer program and computer program product) for executing part or all methods described here. Such programs for implementing the present invention may be stored in a computer-readable medium, or may be in a form of having one or more signals. Such signals can be obtained by downloading from the Internet, or provided on a carrier signal or provided in any other forms.

Figure 4:
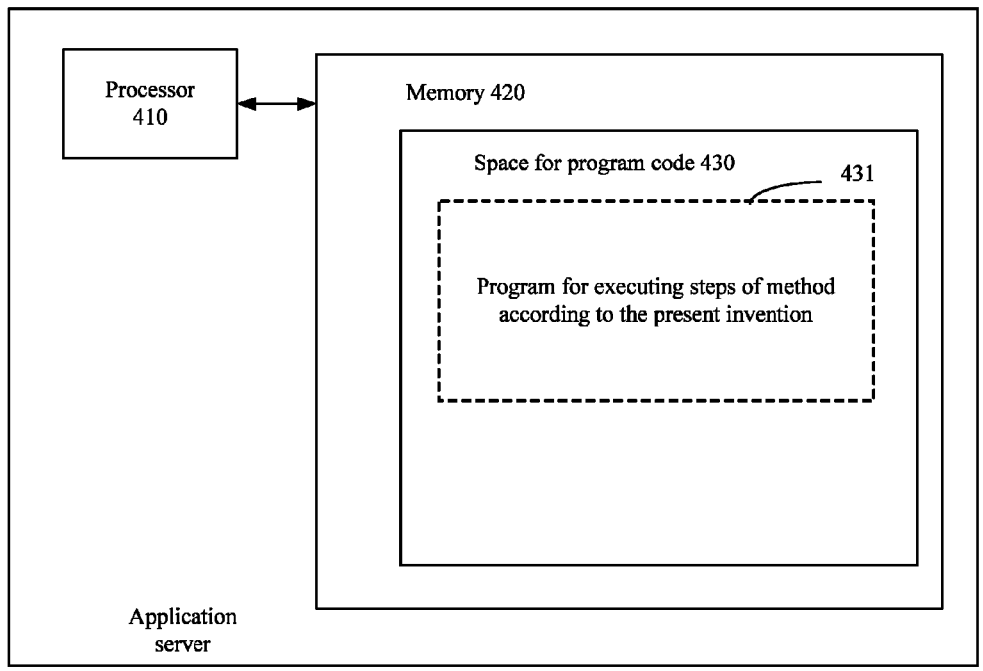
FIG. 4 illustrates a block diagram of a server for executing the method according to the present invention.
Figure 5:
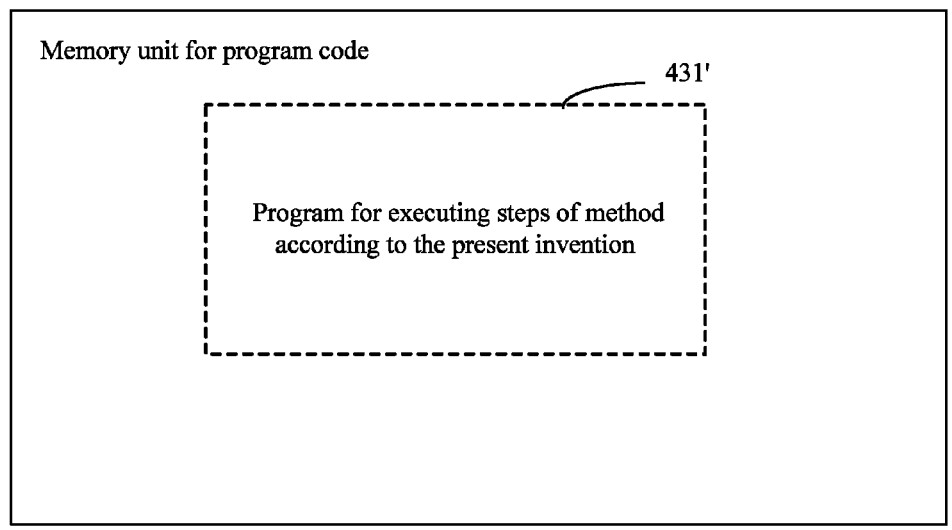
FIG. 5 illustrates a memory unit for maintaining or carrying a program code for implementing the method according to the present invention.

For example, FIG. 4 illustrates a server, such as an application server, which can implement the method for detecting security of a download link according to the present invention. The server conventionally comprises a processor 410 and a computer program product or computer-readable medium in the form of a memory 420. The memory 420 may be an electronic memory such as flash memory, EEPROM (Electrically Erasable Programmable Read-Only Memory), EPROM, hard disk, ROM, or the like. The memory 420 has a storage space 430 for a program code 431 for executing any step of the above method. For example, the storage space 430 for the program code may comprise program codes 431 respectively for implementing steps of the above method. These program codes may be read from one or more computer program products or written into the one or more computer program products. These computer program products comprise program code carriers such as hard disk, compact disk (CD), memory card or floppy disk. Such computer program products are usually portable or fixed memory unit as shown in FIG. 5. The memory unit may have a storage segment, a storage space or the like arranged in a similar way to the memory 420 in the server of FIG. 4. The program code may for example be compressed in a suitable form. Usually, the memory unit includes a computer-readable code 431', namely, a code readable by a processor for example similar to the processor 410. When these codes are run by the server, the server is caused to execute the steps of the method described above.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

The description provided here describes a lot of specific details. However, it is appreciated that embodiments of the present invention may be implemented in the absence of these specific details. In some embodiments, in order to understand the present description without confusions, methods, structures and technologies well known in the art are not specified in detail.

It should be noted that the above embodiments are intended to illustrate but not to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In claims enumerating several units of a device, several of these units can be embodied by one and the same item of hardware. The usage of the words first, second and third, et cetera, does not indicate any ordering. These words are to be interpreted as names.

In addition, it should be noted that the language used in the specification has been principally selected for readability and instructional purposes, and may not have been selected to delineate or circumscribe the inventive subject matter. Therefore, those having ordinary skill in the art appreciate that many modifications and variations without departing from the scope and spirit of the appended claims are obvious. The disclosure of the present invention is intended to be illustrative, but not limiting, of the scope of the invention, which is set forth in the claims.

What is claimed is:

1. A method for detecting security of a download link comprising:
    pre-acquiring, by at least one processor, an information set of download link security;
    extracting, by the at least one processor, information of the download link from a current web page when a user is browsing the web page;
    before requesting to download associated content of the download link, performing, by the at least one processor, a feature matching between the extracted information of the download link and content of the information set to identify security of the download link according to a result of the feature matching; and
    presenting, by the at least one processor, an identification result to the user.

2. The method according to claim 1, wherein the identifying of the security of the download link and the presenting of the identification result to the user comprises:
    identifying the security of the download link by rewriting code of the current web page to change presentation of the download link in the current web page, and presenting the identification result to the user.

3. The method according to claim 1, wherein the feature matching between the information of the download link and the content of the information set comprises:
    performing the feature matching between the information of the download link and the content of the information set when the user triggers a download operation.

4. The method according to claim 3, wherein the identifying of the security of the download link and the presenting of the identification result to the user comprises:
    identifying the security of the link to be downloaded by the user and presenting the identification result to the user before the user confirms the download operation.

5. The method according to claim 1, wherein the information set of download link security comprises one or more of the following lists:
    a download link black list, a download link white list, a download website black list, and/or a download website white list.

6. The method according to claim 5, wherein the identifying of the security of the download link comprises:
    identifying secure download links in the web page; and/or identifying unsecure download links in the web page.

7. The method according to claim 1, wherein the acquiring of the information set of download link security comprises:
    acquiring the information set of download link security from a network side server.

8. The method according to claim 1, wherein the information set of download link security is acquired by at least one of:
    after a client has downloaded a resource, detecting security of the downloaded resource and reporting a detection result to a network side server; and
    generating the information set of download link security by the network side server according to the detection results reported from one or more clients.

9. A device for detecting security of a download link comprising:
    at least one processor to:
    pre-acquire an information set of download link security;
    extract information of the download link in a current web page when a user is browsing the web page to perform a feature matching between the extracted information of the download link and content of the information set before requesting to download associated content of the download link; and
    identify security of the download link according to a result of the feature matching and present an identification result to the user.

10. The device according to claim 9, the at least one processor further to:
    identify the security of the download link by rewriting code of the current web page to change presentation of the download link in the current web page, and present the identification result to the user.

11. The device according to claim 9, the at least one processor further to:

perform the feature matching between the information of the download link and the content of the information set when the user triggers a download operation.

12. The device according to claim 11, the at least one processor further to:
identify the security of the link to be downloaded by the user and present the identification result to the user before the user confirms the download operation.

13. The device according to claim 9, wherein the information set of download link security comprises one or more of the following lists:
a download link black list, a download link white list, a download website black list, and/or a download website white list.

14. The device according to claim 13, the at least one processor further to:
identify secure download links in the web page; and/or
identify unsecure download links in the web page.

15. The device according to claim 9, the at least one processor further to:
acquire the information set of download link security from a network side server.

16. A system for detecting security of a download link comprising:
a network side server, a first class of clients and a second class of clients;
wherein the first class of clients upon completion of resource download, detect security of the downloaded resource and report a detection result to the network side server;
the network side server generates information of download link security according to the detection results reported by one or more of the first class of the clients; and
the second class of clients each comprise:
at least one processor to:
pre-acquire an information set of download link security;
extract information of the download link in a current web page when a user is browsing the web page to perform a feature matching between the extracted information of the download link and content of the information set before requesting to download associated content of the download link; and
identify security of the download link according to a result of the feature matching and present an identification result to the user.

* * * * *